United States Patent Office 3,001,880
Patented Sept. 26, 1961

3,001,880
FLEXIBLE GLASS COMPOSITIONS
Simon Lyon Ruskin, New York, N.Y., assignor to Union Carbide Corporation, New York, N.Y., a corporation of New York
No Drawing. Filed June 3, 1957, Ser. No. 662,967
7 Claims. (Cl. 106—50)

My invention relates to metallic glass, metallo-glass compositions, metallo-concrete compositions. More particularly, my invention relates to flexible glass compositions possessing increased flexibility and strength on traction.

This is a continuation-in-part of my earlier filed applications as follows:

Serial No. 492,803, Metallo-Ceramic Preparations, filed March 7, 1955, and now Patent No. 2,940,951;
Serial No. 541,051, Metallic Compositions, filed Oct. 17, 1955, and now abandoned;
Serial No. 553,186, Inorganic and Organic Metal Compositions, filed Dec. 15, 1955, and now Patent No. 2,951,796;
Serial No. 590,386, Activated Oxide Complexes, filed June 11, 1956;
Serial No. 534,623, Metallo-Glass Compositions, filed Sept. 15, 1955, and now abandoned;
Serial No. 598,766, Metallo-Glass Compositions, filed July 19, 1956, and now abandoned;
Serial No.605,215, Metallo-Glass Compositions, filed August 20, 1956, and now abandoned;
Serial No. 526,766, Metallo-Concrete Compositions, filed August 5, 1955, and now Patent No. 2,910,372.

I have found that the strength or weakness of metallic glass, metallo-glass, and metallo-concrete compositions is dependent upon the development of perfect crystal structure of the materials entering into the formation of the composition. Such crystals have an abnormally high strength. It has customarily been thought that highly refined metals are soft because of the lack of impurities and that impurities impart hardness and strength due to the deposition of the impurities at dislocation sites in the crystal structure. The presence of these accumulations at the dislocation sites is supposed to require greater stress for movement. Thus the art of trying to make a strong material did not consist of trying to get rid of the defects but rather consisted of trying to ensure that these defects do as little harm as possible. Thus defects in crystalline structure are of fundamental importance and dislocations are basic defects in crystalline structure in glass as well as metals. Dislocations in crystals may be considered as deformities of lattice structure very much like a wrinkle in a sheet. Thus the strength of the material is said to depend entirely upon how easily the dislocation can be made to move. If they move freely, the material will be considered soft, while if they move only under great tension, it is considered hard. It is the impurities or other imperfections in the crystal which hinder the movement so that large stress or tension must be applied before they will move. A very considerable literature has grown up to confirm this conception. Dislocations in crystals also attract and repel each other so that increasing the number of dislocations by work hardening or pre-stressing brings with it varying degrees of uncertainty in ultimate resistance to stress which are not predictable. An excess of dislocations can likewise lead to softness and easy rupture.

I have found, as described in my earlier filed applications, that perfecting crystal structure and the elimination of dislocations improves the actual strength of the crystals and permits the free movement of heterogeneous systems of alloys, and in glass to create a more homogeneous diffusion of metals so that there is diminished brittleness, greater flexibility and increased strength. Thus also in metal plating, either in electroplating or in chemical plating or in enameling, the elimination or diminution of crystal dislocations provides a better surface for the application of the plating material.

To accomplish my invention of eliminating dislocations in crystal formation in metals or in glass, I treat the crystalline material with gamma radiation of 100 million r. to 1 billion r. or more prior to forming the melt, or irradiate with 100 million r. to 1 billion r. the glass or metal and then melt to a uniform mass and allow to cool either slowly, rapidly or progressively depending on the nature of the material. Instead of an isotope source for gamma irradiation, I may use an accelerator source of subatomic "pi" mesons.

I have also found that the elimination of dislocations permits changes in the crystal structure to occur which otherwise are not attainable. Thus the change of $TiO_2$ from anatase to rutile can be accomplished after anatase has been irradiated with 400 million r. or a stream of "pi" mesons and hydrolyzed followed by heating to a critical temperature between 280° and 300° C.

Thus also metal oxides irradiated with 100 million r. to 400 million r., to be incorporated into glass, form a more homogeneous glass with improved properties of flexibility, increased resistance to traction and flexion.

Likewise, in the preparation of concrete and metallo-concrete, the homogeneous diffusion of the metal improves with the elimination of crystal dislocations.

To assomplish my invention of improving metals, glass, metallo-glass, and metallo-concrete compositions, I irradiate the crystalline components entering into the formation with 100 million r. to 400 million r. or more prior to forming a melt or prior to sintering depending on the nature of the product. For my irradiation, I employ gamma irradiation, preferably from a cobalt 60 source or other long-lived radioactive isotope such as caesium, or a stream of "pi" mesons from a proton accelerator of 1 billion electron volts or more. In such gamma irradiation there is a well ordered stream of particles in a definite orientation instead of the random pattern generally accepted. These are given off both from disintegrating nuclei of radioactive cobalt 60 as well as the decay of subatomic "pi" mesons. Such well ordered particles are sufficient to eliminate crystal dislocations. Crystal dislocations occur from the accumulation of electrons at a barrier of slight stress and continue to act as a net that both attracts and repels additional electrons. I have found that "pi" mesons, because of their mass being somewhat greater than that of electrons, are able to sweep the electrons away from dislocations and allow normal lattice structures to emerge. These perfect lattice structures are of great strength and increased resistance.

Thus I have found that the average crystal containing many dislocations, after my irradiation with gamma irradiation of 400 million r. or "pi" mesons shows a diminution in density. This is very remarkable since there has hitherto been no known method of diminishing the density of a crystal. Crystal dislocations with folds which capture electrons and metallic atoms are necessarily of higher density than the perfect lattice structure. Thus by sweeping out the dislocations with the "pi" mesons from intense gamma irradiation of 100 million r. to 400 million r., I secure this perfect lattice structure and with it greater strength and flexibility.

Thus in the preparation of glass which is the more readily demonstrable example, I irradiate with 400 million r. the crystalline components that enter into the formation of a glass batch such as $SiO_2$, $Na_2O$, $CaO$, $Al_2O_3$, or I may use a batch containing in addition, $TiO_2$, $ZrO_2$, MgO. These materials are irradiated as above and fluxed to a glass. The resultant glass compared with carefully controlled batches shows diminished density, increased resistance to traction and increased strength on flexion. Thus the flexibility of glass has been increased.

*Example I*

A glass batch of the following composition was irradiated with 400 million r. from a cobalt 60 source:

| | Percent |
|---|---|
| $SiO_2$ | 73.65 |
| $Na_2O$ | 15.42 |
| $CaO$ | 10.20 |
| $Al_2O_3$ | 0.25 |

The metallic composition was:

| | |
|---|---|
| Si | 34.48 |
| Na | 11.50 |
| Ca | 7.30 |
| Al | 0.13 |

The whole was fused to a glass and density was compared with glass made from identical non-irradiated control batches. The density measurements were conducted by the standard procedure of observing the rate of sinking when suspended in solvents of known density.

The following results were observed:

| Average Readings | |
|---|---|
| Non-Irradiated | Irradiated with 400 million r. |
| 0.0056 | 0.0014 |
| Rupture on Traction (fiber 1µ) | |
| 14.4 | 15.8 |
| Rupture on Flexion (fiber 1µ–40 mm.) | |
| 198. | 242. |

*Example II*

Batches of composition similar to Example I.

| Average Density | |
|---|---|
| Non-Irradiated | Irradiated with 400 million r. |
| 0.0057 | 0.0005 |
| Rupture on Traction (fiber 1µ) | |
| 13.2 | 15.8 |
| Rupture on Flexion (fiber 1µ–40 mm.) | |
| 216. | 217. |

*Example III*

A glass batch of the following composition was irradiated with 400 million r. from a cobalt 60 source:

| | |
|---|---|
| $SiO_2$ | 69.00 |
| $Na_2O$ | 14.85 |
| $CaO$ | 8.00 |
| $Al_2O_3$ | 0.99 |
| $TiO_2$ | 0.94 |
| $ZrO_2$ | 1.63 |
| $MgO$ | 4.63 |

The calculations of the metal components:

| | |
|---|---|
| Si | 32.15 |
| Na | 11.10 |
| Ca | 5.71 |
| Al | 0.52 |
| Ti | 0.56 |
| Zr | 1.20 |
| Mg | 2.78 |

Density determination showed:

| Non-Irradiated | Irradiated, 400 million r. |
|---|---|
| 0.0116 | 0.0 |
| Rupture after Traction (fiber 1µ) | |
| 16.6 | 19.2 |
| Rupture after Flexion (fiber 1µ–40 mm.) | |
| 187. | 202. |

The preparation of glass following irradiation of the glass batch as described above may be conducted according to the techniques and conditions utilized for soda-lime-silica type glass in section IX, Handbook of Glass Manufacture (1953), edited by F. Tooley, and published by the Ogden Publishing Company. Exemplary of such conditions are those found on pages 243 through 252 of said handbook.

What I claim is:

1. In a process for making soda-lime-silica type glass from a glass batch containing crystalline material, the improvement which comprises gamma irradiating said crystalline material with from about 100 million roentgens to about 400 million roentgens before said glass batch is fused into glass.

2. In a process for making glass fibers from a glass batch containing crystalline material, the improvement which comprises gamma irradiating said crystalline material with from about 100 million roentgens to about 400 million roentgens before said glass batch is fused into glass.

3. In a process for making soda-lime-silica type glass from a glass batch, the improvement which comprises gamma irradiating a glass batch comprising silicon oxide, sodium oxide, calcium oxide and aluminum oxide with from about 100 million roentgens to about 400 million roentgens before said glass batch is fused into glass.

4. In a process for making soda-lime-silica type glass from a glass batch, the improvement which comprises gamma irradiating a glass batch comprising silicon oxide, sodium oxide, calcium oxide, aluminum oxide, titanium oxide, zirconium oxide and magnesium oxide with from about 100 million roentgens to about 400 million roentgens before said glass batch is fused into glass.

5. Flexible soda-lime-silica type glass produced by a process for making glass from a glass batch, in which said glass batch is irradiated with from about 100 million roentgens to about 400 million roentgens before said batch is fused into glass.

6. The process of making a soda-lime-silica type glass from a glass batch comprising crystalline material which comprises subjecting said crystalline material to gamma radiation from a radioactive isotope source of the order of 100 million roentgens to 400 million roentgens, and fusing the crystalline material into glass.

7. The process of making soda-lime-silica type glass fibers which comprises subjecting a glass batch comprising crystalline material to gamma radiation from a radioactive isotope source of the order of 100 million roentgens to 400 million roentgens, and melting and preparing the irradiated crystalline material into glass fibers.

References Cited in the file of this patent

UNITED STATES PATENTS

| 2,505,633 | Whaley | Apr. 25, 1950 |
| 2,631,356 | Sparks et al. | Mar. 17, 1953 |
| 2,640,784 | Tiede | June 2, 1953 |
| 2,664,359 | Dingledy | Dec. 29, 1953 |
| 2,770,922 | Fitzgerald et al. | Nov. 20, 1956 |

OTHER REFERENCES

Journal American Ceramic Society, vol. 35, pp. 259–264 (1952).

Handbook of Glass Manu., by Tooley, pages 41, 42 (2nd Ed., 1957).

UNITED STATES PATENT OFFICE
CERTIFICATE OF CORRECTION

Patent No. 3,001,880　　　　　　　　　　　　September 26, 1961

Simon Lyon Raskin

It is hereby certified that error appears in the above numbered patent requiring correction and that the said Letters Patent should read as corrected below.

Column 4, line 26, after "making" insert -- soda-lime-silica type --.

Signed and sealed this 15th day of May 1962.

(SEAL)
Attest:

ERNEST W. SWIDER　　　　　　　　　　　　DAVID L. LADD
Attesting Officer　　　　　　　　　　　　Commissioner of Patents